US011909698B2

United States Patent
Gollareddy et al.

(10) Patent No.: US 11,909,698 B2
(45) Date of Patent: Feb. 20, 2024

(54) METHOD AND SYSTEM FOR IDENTIFYING IDEAL VIRTUAL ASSISTANT BOTS FOR PROVIDING RESPONSE TO USER QUERIES

(71) Applicant: BITONIC TECHNOLOGY LABS, INC., New Castle, DE (US)

(72) Inventors: Jaya Kishore Reddy Gollareddy, Karnataka (IN); Raghavendra Kumar Ravinutala, Karnataka (IN); Rashid Ahmad Khan, Karnataka (IN); Biddwan Ahmed, Karnataka (IN); Surender Selvaraj, Karnataka (IN)

(73) Assignee: BITONIC TECHNOLOGY LABS, INC., New Castle, DE (US)

( * ) Notice: Subject to any disclaimer, the term of this patent is extended or adjusted under 35 U.S.C. 154(b) by 0 days.

(21) Appl. No.: 17/793,298

(22) PCT Filed: Jan. 15, 2021

(86) PCT No.: PCT/IB2021/050290
§ 371 (c)(1),
(2) Date: Jul. 15, 2022

(87) PCT Pub. No.: WO2021/144750
PCT Pub. Date: Jul. 22, 2021

(65) Prior Publication Data
US 2023/0353512 A1    Nov. 2, 2023

(30) Foreign Application Priority Data
Jan. 17, 2020   (IN) .............................. 201941028691

(51) Int. Cl.
G06F 15/16       (2006.01)
H04L 51/02       (2022.01)
(Continued)

(52) U.S. Cl.
CPC .......... H04L 51/02 (2013.01); G06F 16/3329 (2019.01); G06F 40/30 (2020.01)

(58) Field of Classification Search
None
See application file for complete search history.

(56) References Cited

U.S. PATENT DOCUMENTS

2017/0180284 A1    6/2017  Smullen et al.
2018/0285682 A1*  10/2018  Najibi .................... G06T 7/194
(Continued)

FOREIGN PATENT DOCUMENTS

WO       2021144750 A1    7/2021

OTHER PUBLICATIONS

Foreign Communication from a Related Counterpart Application, International Search Report and Written Opinion dated Mar. 23, 2021, International Application No. PCT/IB2021/050290 filed on Jan. 15, 2021.

(Continued)

Primary Examiner — Phuoc H Nguyen
(74) Attorney, Agent, or Firm — Conley Rose, P.C.

(57) ABSTRACT

A method and bot assistance system (101) for identifying ideal virtual assistant bots for providing response to user queries is disclosed. The bot assistance system receives user query. The user query is processed to identify context and intent using Natural Language Processing (NLP). The bot assistance system identifies at least one virtual assistant bot for responding to user query based on confidence score of each virtual assistant bot associated with intent of user query, using pretrained model. The identification of at least one virtual assistant bot includes either determining ideal virtual assistant bot based on context of user query, using predefined governance rules. Otherwise, initiating polling between plurality of predefined virtual assistant bots when (Continued)

context of user query is unidentified. The plurality of predefined virtual assistance bots is provided to user associated with user query if each of predefined virtual assistance bots are selected during polling.

10 Claims, 7 Drawing Sheets

(51) Int. Cl.
  *G06F 40/30* (2020.01)
  *G06F 16/332* (2019.01)

(56) References Cited

U.S. PATENT DOCUMENTS

| | | | |
|---|---|---|---|
| 2018/0300337 A1 | 10/2018 | Thomas et al. | |
| 2018/0300399 A1 | 10/2018 | Blandin et al. | |
| 2021/0081819 A1* | 3/2021 | Polleri | H04L 51/02 |
| 2021/0082400 A1* | 3/2021 | Vishnoi | G06F 40/284 |
| 2021/0150146 A1* | 5/2021 | Alexander | G06F 40/30 |
| 2023/0170069 A1* | 6/2023 | Groteke | G16H 30/40 |
| | | | 382/128 |

OTHER PUBLICATIONS

Foreign Communication from a Related Counterpart Application, International Preliminary Report on Patentability dated May 10, 2022, International Application No. PCT/IB2021/050290 filed on Jan. 15, 2021.

\* cited by examiner

METHOD AND SYSTEM FOR IDENTIFYING IDEAL VIRTUAL ASSISTANT BOTS FOR PROVIDING RESPONSE TO USER QUERIES

CROSS-REFERENCE TO RELATED APPLICATIONS

The present application is a filing under 35 U.S.C. 371 as the National Stage of International Application No. PCT/IB2021/050290, filed Jan. 15, 2021, entitled "METHOD AND SYSTEM FOR IDENTIFYING IDEAL VIRTUAL ASSISTANT BOTS FOR PROVIDING RESPONSE TO USER QUERIES," which claims priority to Indian Application No. 201941028691 filed with the Intellectual Property Office of India on Jan. 17, 2020, both of which are incorporated herein by reference in their entirety for all purposes.

TECHNICAL FIELD

The present subject matter is related in general to bot detection and communication, more particularly, but not exclusively to method and system for providing dynamic cross-domain learning.

BACKGROUND

In recent past, voice and chat bots have gained huge popularity. Essentially, a BOT (which is short for "robot") is an automated application or program implemented within a presence-based, two-way communication network such as an instant messaging (IM) or voice over IP network (VoIP), with which a user can interact. Over last decade, chat services have become preferred option to obtain customer support. More recently, human chat service agents are frequently replaced by conversational software agents (CAs) such as chatbots, which are designed to communicate with human users by means of natural language.

Currently, the bots deployed on various platforms are singular in nature. That is, for example, for an employee in an enterprise who wants to apply for a leave in a leave portal and also check status of a pending purchase order has to go through multiple bots. This account to accessing multiple hots for each task. This may add a cognitive load on the users to remember different bots for each tasks and hence generally leads to a poor user experience.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for identifying ideal virtual assistant bots for providing response to user queries. The method comprises receiving a user query from a user device. The user query is processed to identify a context and intent using Natural Language Processing (NLP). The method includes identifying at least one virtual assistant bot from a plurality of virtual assistant bots associated with an entity for responding to the user query, based on a confidence score of each virtual assistant bot associated with the intent of the user query, using a pretrained model. The identification of at least one virtual assistant bot includes either determining an ideal virtual assistant bot based on the context of the user query, using predefined governance rules. Otherwise, the method includes initiating a polling between a plurality of predefined virtual assistant bots of the plurality of virtual assistant bots when the context of the user query is unidentified. The plurality of predefined virtual assistance bots is provided to a user associated with the user query if each of the plurality of predefined virtual assistance bots are selected during polling.

In an embodiment, the present disclosure may relate to a bot assistance system for identifying ideal virtual assistant bots for providing response to user queries. The bot assistance system may comprise a processor and a memory communicatively coupled to the processor, where the memory stores processor executable instructions, which, on execution, may cause the bot assistance system to receive a user query from a user device. The user query is processed to identify a context and intent using Natural Language Processing (NLP). The bot assistance system identifies at least one virtual assistant bot from a plurality of virtual assistant bots associated with an entity for responding to the user query, based on a confidence score of each virtual assistant bot associated with the intent of the user query, using a pretrained model. The identification of at least one virtual assistant bot includes either determining an ideal virtual assistant bot based on the context of the user query, using predefined governance rules. Otherwise, the bot assistance system initiating a polling between a plurality of predefined virtual assistant bots of the plurality of virtual assistant bots when the context of the user query is unidentified. The plurality of predefined virtual assistance bots is provided to a user associated with the user query if each of the plurality of predefined virtual assistance bots are selected during polling.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
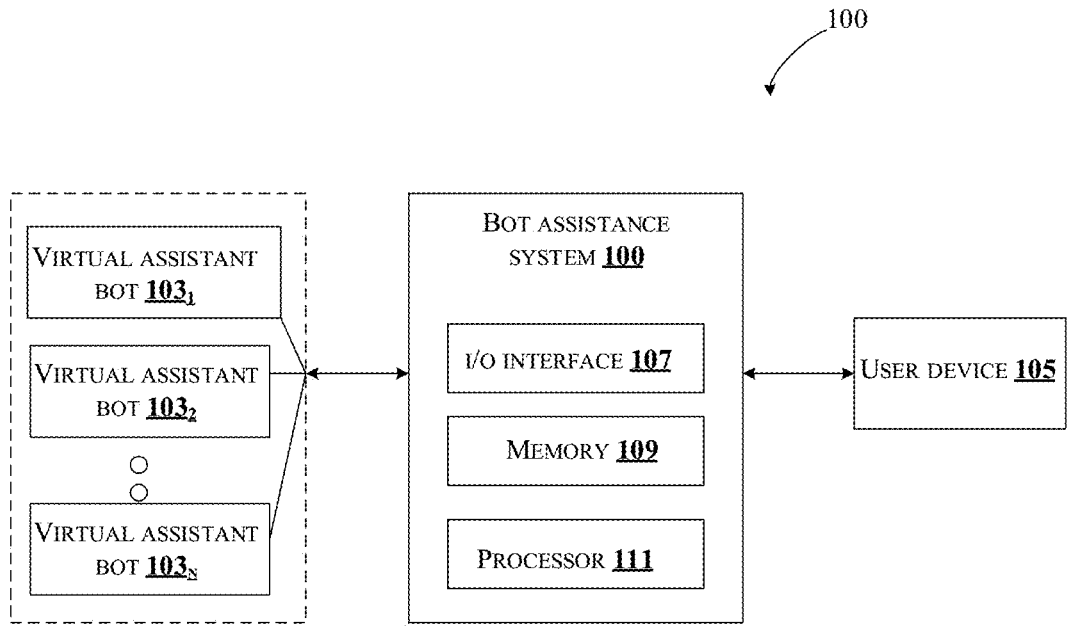
FIG. 1a-1b illustrates an exemplary environment for identifying ideal virtual assistant bots for providing response to user queries in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a method and bot assistance system for identifying ideal virtual assistant bots for providing response to user queries. Typically, a virtual assistant bot may refer to an application program for performing one or more automated activities in various environment. As an example, the virtual assistant bots may include, chatbots, bots, voice bots and the like. Typically, the virtual assistant bots may perform one or more activities learned previously. Currently, the bots deployed on various platforms are singular in nature. That is, for example, for an employee in an enterprise who wants to apply for a leave in a leave portal and also check status of a pending purchase order has to go through multiple bots. This account to accessing multiple bots for each task. This may add a cognitive load on the users to remember different bots for each tasks and hence generally leads to a poor user experience.

The present disclosure resolves this problem by providing a unified bot assistance system for providing response to user queries. Particularly, the bot assistance system identifies an ideal virtual assistant bot which is capable of resolving the user queries. The bot assistance system identifies at least one virtual assistant bot from a plurality of virtual assistant bots based on a confidence score of each virtual assistant bot associated with an intent of the user query, using a pretrained model. The ideal virtual assistant bot is determined based on context of the user query. However, if the context is unidentified, a polling is initiated between a plurality of predefined virtual assistant bots of the plurality of virtual assistant bots. In case, each of the plurality of predefined virtual assistance bots are selected during polling, an option is provided to user for selecting an appropriate virtual bot among the selected predefined virtual assistant bots. Therefore, the present disclosure provides response to user queries using a unified interface which orchestrates and interacts with multiple virtual assistant bots. This improves productivity of the user and enhances user experience. Thus, present disclosure provides a dynamic mechanism for managing the virtual assistant bots during multi tasks and based on dynamic multi-contextual queries. This helps in reducing the cognitive load on the user while using chat and voice bots and improves the manageability of bots.

Figure 1B:
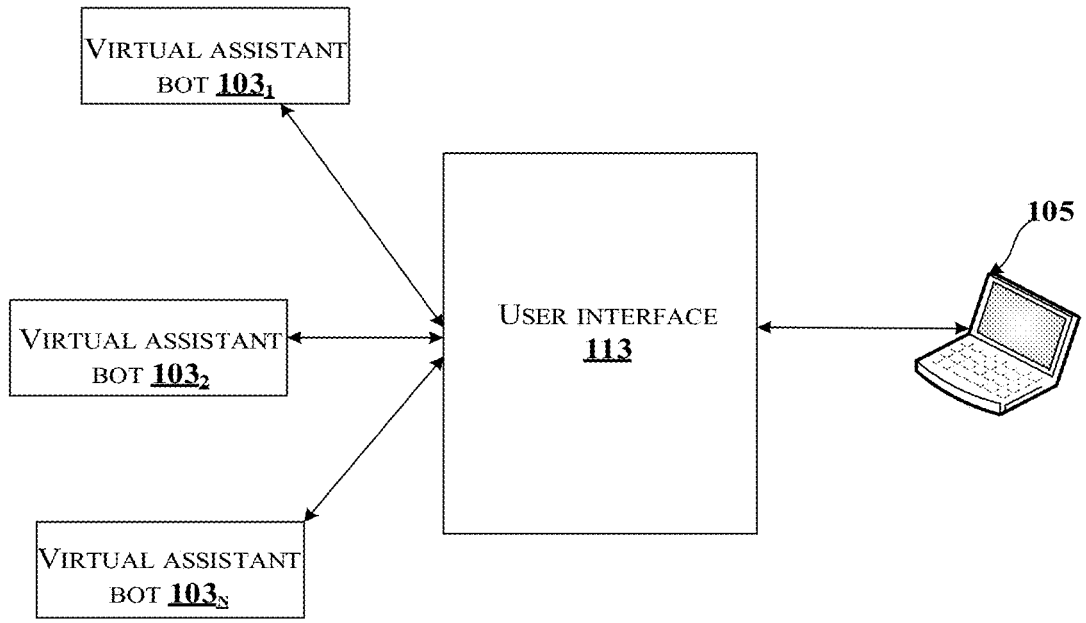

FIG. 1a-1b illustrates an exemplary environment for identifying ideal virtual assistant bots for providing response to user queries in accordance with some embodiments of the present disclosure.

As shown in FIG. 1a, an environment 100 includes a bot assistance system 101 connected to a virtual assistant bot $103_1$, a virtual assistant bot $103_2$, and a virtual assistant bot $103_N$ (collectively referred as plurality of virtual assistant bot 103). Further, the bot assistance system 101 is connected to a user device 105 through a communication network (not shown explicitly in FIG. 1a, covered in FIG. 6). In an embodiment, the bot assistance system 101 may be connected to a plurality of user devise for providing response to user queries. In an embodiment, the communication network may include, but is not limited to, a direct interconnection, a Peer-to-Peer (P2P) network, Local Area Network (LAN), Wide Area Network (WAN), wireless network (for example, using Wireless Application Protocol), Internet, Wi-Fi, and the like. Typically, a virtual assistant bot may refer to an application program for performing one or more automated activities in various environment. As an example, the virtual assistant bots may include, chatbots, bots, voice bots and the like. A person skilled in the art would understand that any other virtual assistant bot in an environment, not mentioned herein explicitly, may also be referred in the present disclosure.

The bot assistance system 101 may identify ideal virtual assistant bots for providing response to user queries. Particularly, the bot assistance system 101 may provide a unified user interface to a user of the user device 105 for providing response to any queries. FIG. 1b shows an exemplary embodiment with a unified user interface 113 for providing response to user queries. Returning to FIG. 1*a*, the bot assistance system 101 may include, but is not limited to, a laptop, a desktop computer, a notebook, a smartphone, IOT devices, system, a tablet, a server, and any other computing devices. A person skilled in the art would understand that, any other devices, not mentioned explicitly, may also be used as the bot assistance system 101 in the present disclosure. In an embodiment, the bot assistance system 101 may either to connected to a computing environment of an entity such as, an organisation, institution, and the like, for identifying the ideal virtual assistant bots associated with the entity for providing response to user queries. Alternatively, the bot assistance system 101 may be implemented with the computing environment of the entity for identifying the ideal virtual assistant bots associated with the entity for providing response to user queries.

Further, the bot assistance system 101 may include an I/O interface 107, a memory 109 and a processor 111. The I/O interface 107 may be configured to receive a user query from the user device 105. The data from the I/O interface 107 may be stored in the memory 109. The memory 109 may be communicatively coupled to the processor 111 of the bot assistance system 101. The memory 109 may also store processor instructions which may cause the processor 111 to execute the instructions for identifying the ideal virtual assistant bots associated with the entity for providing response to user queries.

Initially, when a user query is received from the user device 105, the bot assistance system 101 may process the user query to identify a context associated with the user query and intent using Natural Language Processing (NLP) technique. The context is with respect to specific department associated with the entity. For instance, when the entity is bank, the context may be with respect to home loan, personal loan, account detail, saving information and the like. The content and intent identification may include spell correction, synonym replacement and the like. In an embodiment, the context and intent of the user query may be identified using known processing techniques.

The bot assistance system may identify at least one virtual assistant bot from the plurality of virtual assistant bots 103 for responding to the user query using a pretrained model. In an embodiment, the pretrained model is a machine learning model. The bot assistance system 101 compares a confidence score associated with the intent of each virtual assistant bot with a threshold confidence score. Based on the comparison, if the confidence score for a virtual assistant bot is greater than the threshold confidence score, the bot assistance system 101 may identify an ideal virtual assistant bot which may be relevant to the user query. However, when the confidence score is below the threshold confidence score, the bot assistance system 101 may provide a list of virtual assistant bot closely matching context to the user query using an unsupervised fallback model. Particularly, the bot assistance system 101 determines the ideal virtual assistant bot based on the context of the user query using predefined governance rules. In an embodiment, the predefined governance rules may be business logic depending on the entity. That is, the predefined governance rules may include information on context of each virtual assistant bot. In case of determining the ideal virtual assistant bot of the plurality of virtual assistant bots 103, the bot assistance system 101 may pass control to the ideal virtual assistant bot for providing response to the user query.

Alternatively, in case, the context of the user query is unidentified. For example, consider the user query is "what is rate of interest". As illustrated, the query is regarding general rate of interest, and no specific context is provided for example, if the rate of interest is for home loan, or personal loan and the like. In such cases, when the context of the user query is unidentified from the user query, the bot assistance system 101 initiates a polling between a plurality of predefined virtual assistant bots of the plurality of virtual assistant bots 103. The plurality of predefined virtual assistant bots comprises primary bots. Essentially, the bot assistance system 101 may set the plurality of virtual assistant bots as primary bots and secondary bots. The primary bots are the predefined virtual assistant bots which are authorised for participating in the polling and the secondary bots are associated with mere selection by the bot assistance system 101. Thus, the polling is initiated between the primary bots. Based on the polling, the primary bots may nominate and identify the ideal virtual assistant bot which is ideal for responding to the user query. In case of a conflict during polling, for instance, when a plurality of primary bots has a tie, the bot assistance system 101 may decide based on a priority which is set initially for each of the predefined virtual assistant bots.

However, each of the plurality of predefined virtual assistant bots are selected during polling, the bot assistance system 101 provides an option to the user associated with the user query for selecting the ideal virtual assistant bot. Further, responses/virtual assistant bot selected by the user based on the options may be stored for learning. Particularly, the bot assistance system 101 initiates feedback learning for the fallback model based on the responses or suggestions provided by a number of users for a similar user query.

Figure 2:
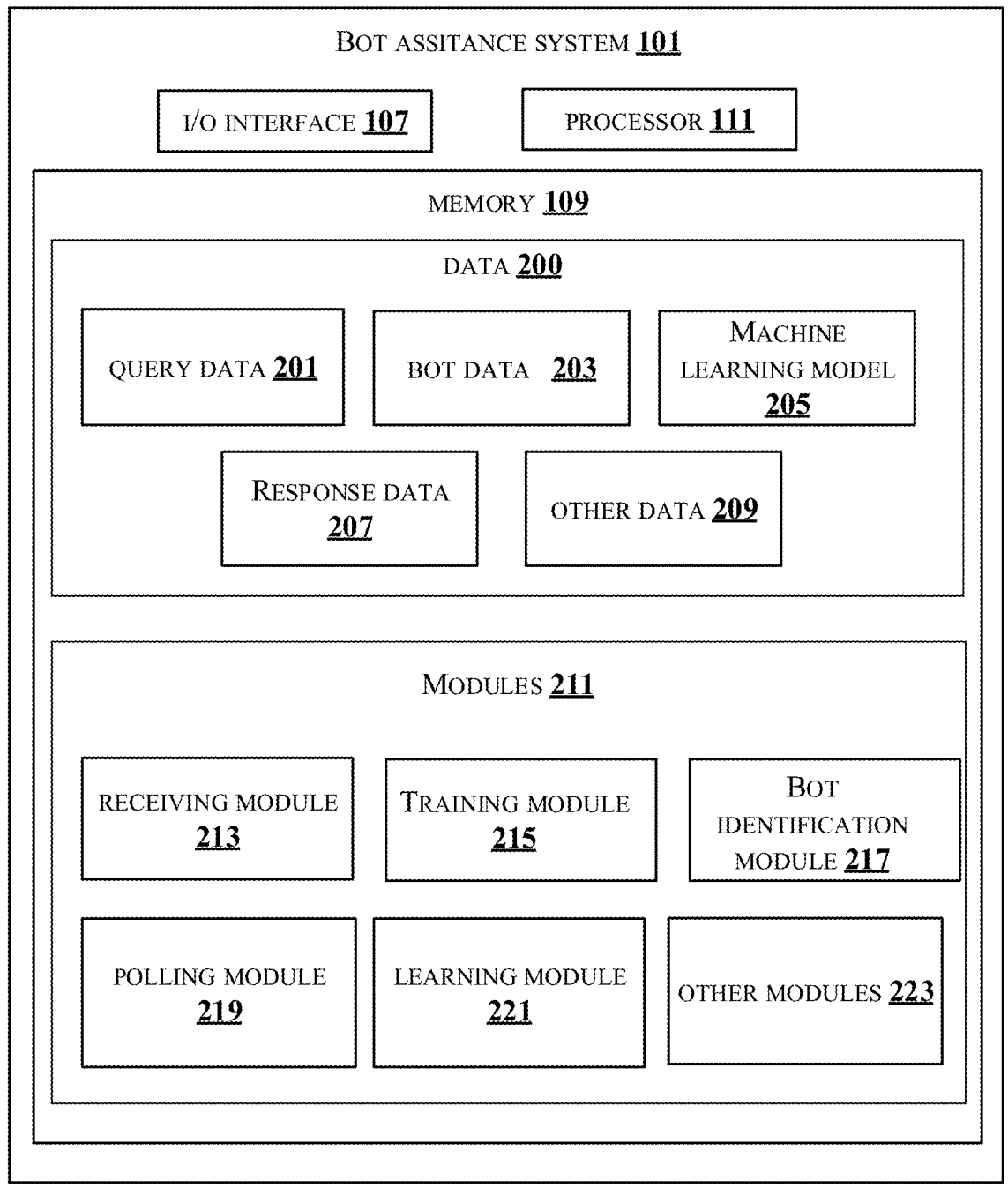
FIG. 2 shows a detailed block diagram of a bot assistance system in accordance with some embodiments of the present disclosure.

FIG. 2 shows a detailed block diagram of a bot assistance system in accordance with some embodiments of the present disclosure.

The bot assistance system 101 may include data 200 and one or more modules 211 which are described herein in detail. In an embodiment, data 200 may be stored within the memory 109. The data 200 may include, for example, query data 201, bot data 203, machine learning model 205, response data 207 and other data 209.

The query data 201 may include the query received from the user device 105. The query may be in multi-lingual languages. The query data 201 may include the context and intent associated with the user query.

The bot data 203 may include confidence score associated with each virtual assistant bot of the plurality of virtual assistant bots 103. Further, the bot data 203 may include details about the primary bots and the secondary bots.

The machine learning model 205 may include one or more machine learning models for determining the ideal virtual assistant bot. For instance, the one or more machine learning models may be trained using deep neural network techniques. A person skilled in the art would understand that the technique defined is exemplary technique and the machine learning models may also include any other machine learning techniques.

The response data 207 may include a response which is provided for the user query. Further, the response data 207 may include responses and suggestions provided by the user on the option to select the ideal virtual assistant bot.

The other data 209 may store data, including temporary data and temporary files, generated by modules 211 for performing the various functions of the bot assistance system 101.

In an embodiment, the data 200 in the memory 109 are processed by the one or more modules 211 present within the memory 109 of the bot assistance system 101. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 111 for performing one or more functions of the bot assistance system 101. The said modules 211 when configured with the functionality defined in the present disclosure will result in a novel hardware.

In one implementation, the one or more modules 211 may include, but are not limited to a receiving module 213, a training module 215, a bot identification module 217, a polling module 219 and a learning module 221. The one or more modules 211 may also include other modules 223 to perform various miscellaneous functionalities of the bot assistance system 101. In an embodiment, the other modules 223 may include a priority setting module for determining and setting the priority for primary bot.

The receiving module 213 may receive the user query from the user device 105. Further, the receiving module 213 may receive responses/inputs from the ideal virtual assistant bot for providing to the user device 105.

The training module 215 may train the machine learning models for determining at least one ideal virtual assistant bot from the plurality of virtual assistant bots 103. FIG. 3b shows an exemplary diagram for initiating feedback learning in accordance with some embodiments of the present disclosure. In an embodiment, the training module 215 may utilize transfer learning along with models to provide high data-efficiency. As shown, the training module 215 makes use of embeddings which considers entire sentence of the user query. The training module 215 uses a multilingual sentence model allowing the plurality of virtual assistant bots 103 to be trained in multiple languages without translation. The training module 215 may determine a priority associated with each primary bot and set the priority.

Returning to FIG. 2, the bot identification module 217 may identify at least one virtual assistant bot from the plurality of virtual assistant bots 103 for responding to the user query. The bot identification module 217 may first determine the context and intent of the user query using the pretrained model. In case, the context of the user query is not identified, the bot identification module 217 intimates the polling module 219. On identifying the context, the bot identification module 217 may compare the confidence score associated with the intent of each virtual assistant bot with the threshold confidence score. Based on the comparison, if the confidence score for a virtual assistant bot is greater than the threshold confidence score, the bot assistance system 101 may identify an ideal virtual assistant bot which may be relevant to the user query. However, when the confidence score is below the threshold confidence score, the bot assistance system 101 may provide a list of virtual assistant bot closely matching context to the user query to the user for appropriate selection. Particularly, the bot assistance system 101 determines the ideal virtual assistant bot based on the context of the user query using predefined governance rules. In case of determining the ideal virtual assistant bot of the plurality of virtual assistant bots 103, the bot identification module 217 may pass control to the ideal virtual assistant bot for providing response to the user query.

The polling module 219 may initiate a polling between the plurality of predefined virtual assistant bots of the plurality of virtual assistant bots 103. The polling is initiated on receiving the intimation regarding unidentified context from the bot identification module 217. The polling module 219 may initiates the polling between the primary bots. The primary bots are the predefined virtual assistant bots which are authorised for participating in the polling. Based on the polling, the primary bots may nominate and identify the ideal virtual assistant bot which is ideal for responding to the user query. In case of a conflict during polling, for instance, when a plurality of primary bots has a tie, the polling module 219 may decide based on the priority which is set initially for each of the predefined virtual assistant bots. In case, each of the plurality of predefined virtual assistant bots are selected during polling, the polling module 219 may provides an option to the user associated with the user query for selecting the ideal virtual assistant bot. Particularly, the polling module 219 may provide the list of the predefined virtual assistant bots along with respective responses for the user query.

The learning module 221 may initiate the feedback learning for the bot assistance system 101, particularly for the fallback model of the pretrained model based on the responses or suggestions provided by a number of users for the similar user query.

Figure 4:
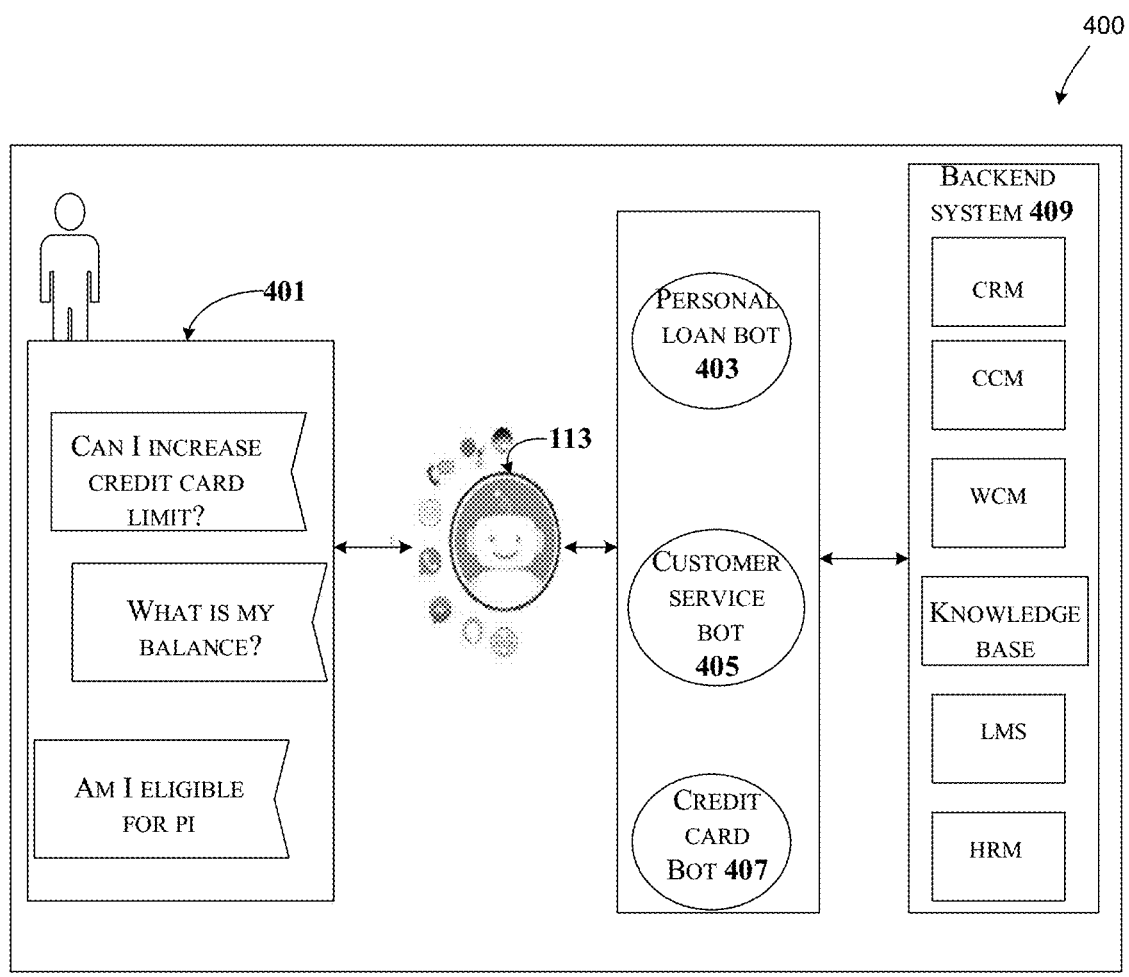
FIG. 4 shows an exemplary scenario of bank for identifying ideal virtual assistant bots for providing response to user queries in accordance with some embodiments of present disclosure.

FIG. 4 shows an exemplary scenario of bank for identifying ideal virtual assistant bots for providing response to user queries in accordance with some embodiments of present disclosure.

FIG. 4 shows an exemplary scenario of banking environment for resolving user queries using virtual assistance. In current context, a user 402 is provided with a unified user interface 113 of the bot assistance system 101 for queries associated with their banking account. As shown, the user 402 may enter user queries 401 in the user interface 113 (acting as a virtual assistant bot). In current context, the bot assistance system 101 may include three virtual assistant bots such as, personal loan bot 403, customer service bot 405 and credit card bot 407. The bot assistance system 101 may process the user query such as "can I increase my credit card limit" and determine the context, which is related to credit cards and the intent, which is to increase the card limit. Accordingly, the bot assistance system 101 may check in background the confidence score associated with each virtual assistant bot and determine the ideal virtual assistant bot, i.e., the credit card bot 407 for responding to the user query 401.

Figure 3A:
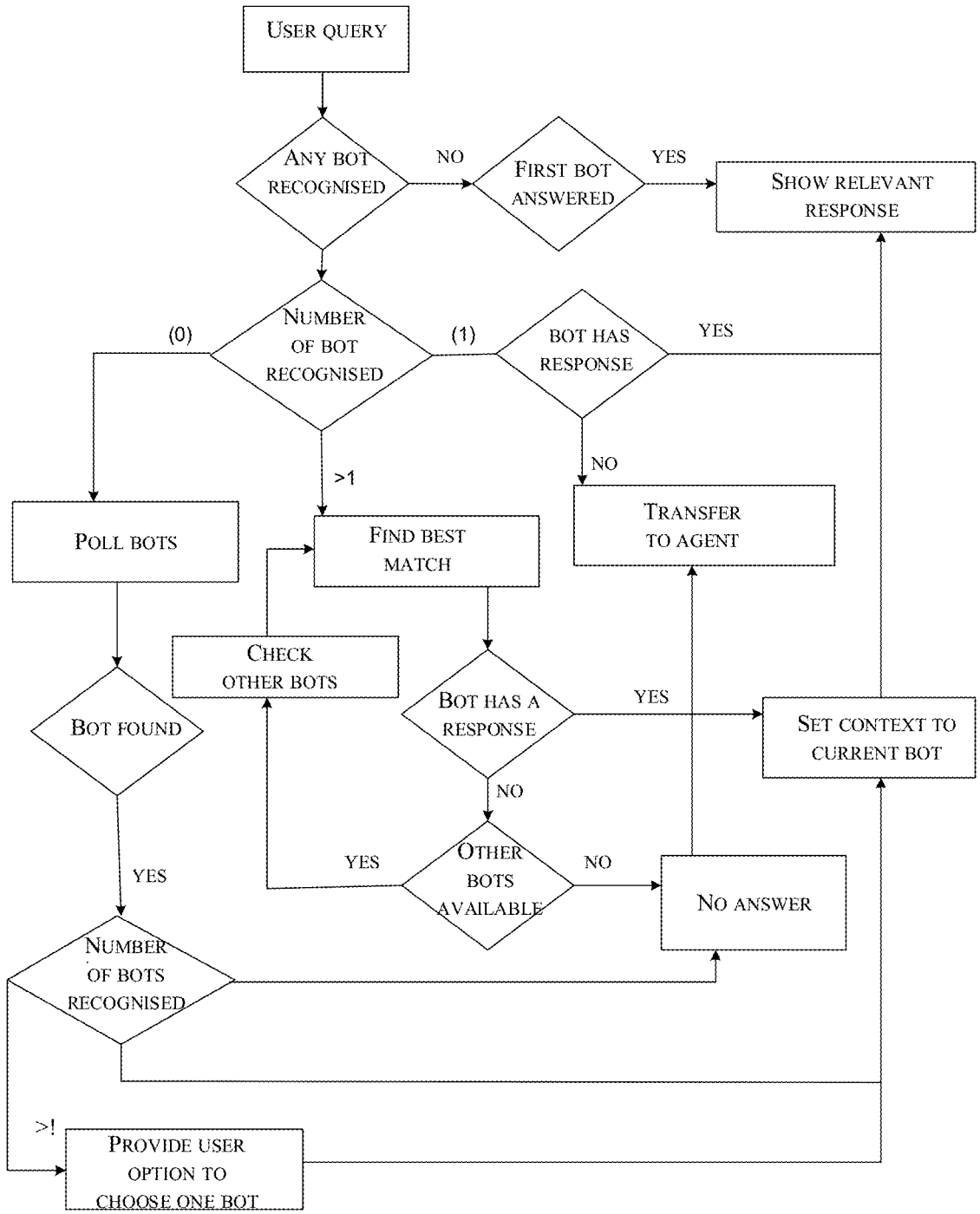
FIG. 3a shows an exemplary flowchart for selecting a virtual bot in accordance with some embodiments of the present disclosure.
Figure 3B:
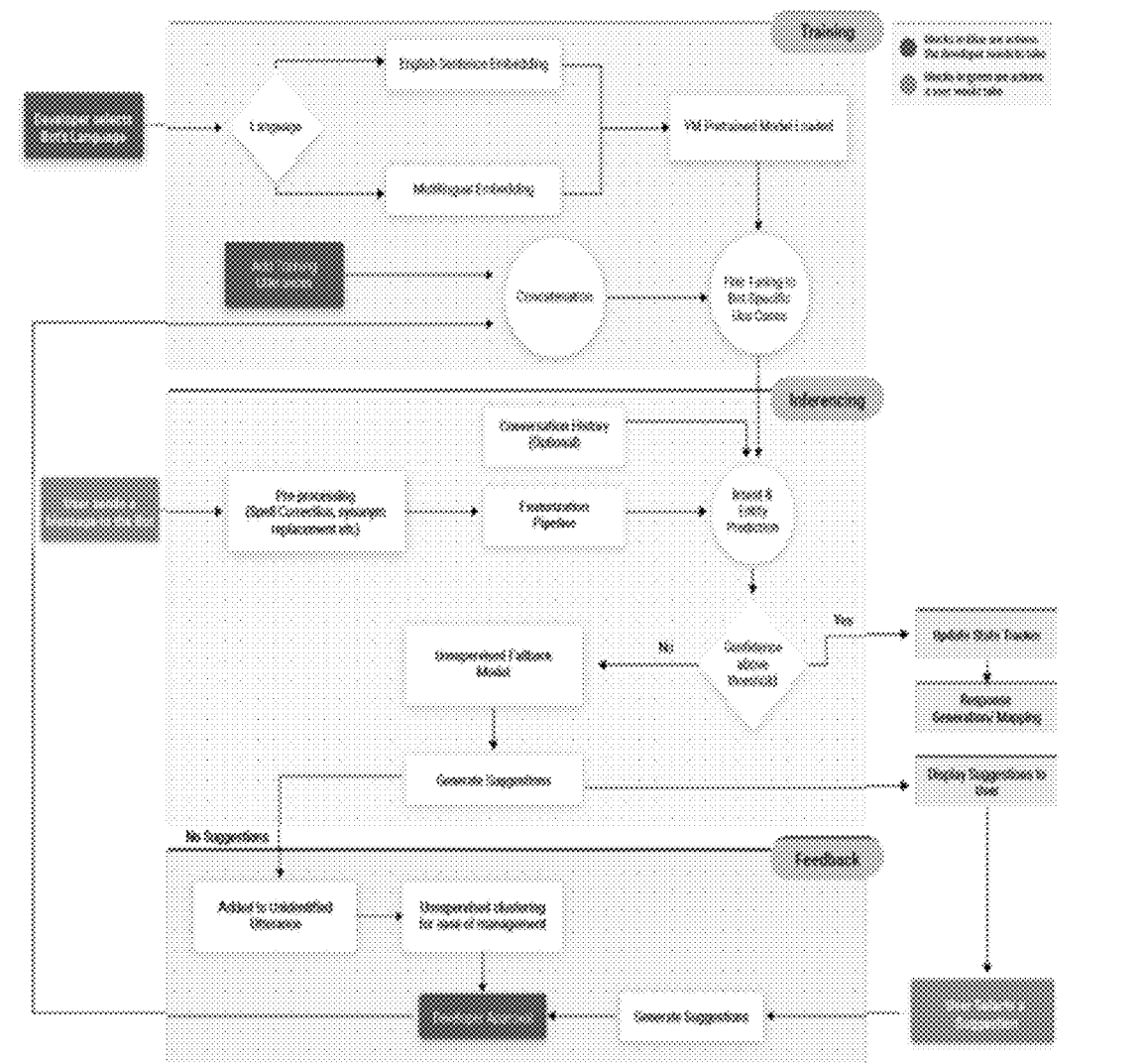
FIG. 3b shows an exemplary diagram for initiating feedback learning in accordance with some embodiments of the present disclosure.

FIG. 3a shows an exemplary flowchart for selecting a virtual bot in accordance with some embodiments of the present disclosure.

FIG. 3 shows a real-world scenario for implementing the bot assistance system 101 with a financial product. As shown in the FIG. 3a, initially context is set with one or more children application, e.g., child 1. In an embodiment, a product identifier may be supported by text analysed boosted search. In such case, the user may ask a bot to check if any product has been recognized. In case if any product is recognized, the bot may check for number of products recognized. However, if no product is recognized, the child 1 may have an answer and may show relevant response.

Further, in case if the recognized product is zero (0), the bot assistance system 101 may poll all bots for relevance and check for existing bots. If the bots exist, the bot assistance system 101 may check for number of bots recognized. In another case, if number of bots recognized is greater than one (>1), the bot assistance system 101 may ask user to choose one. Further, if number of bots recognized is one, the context is set to current bot which may show the relevant response. If the number of bots recognized is zero, the bot assistance system 101 may not have an any answer and may transfer the query to an agent.

Further, if the product recognized is greater than one (>1), the bot assistance system 101 may check for a better match and check for a bot which comprises a response. In case, if the bot includes a response, the context may be set to current bot. However, if the bot has no response, the bot assistance system 101 may check for other available bots. In case, if other available bots are present, the bot assistance system 101 may check other bots and find the better match. Further, if the product recognized is one (1), the bot assistance system 101 may check if the bot comprises a response. In case, the bot comprises the response, relevant response from the bot is retrieved. However, if no response is available, the bot assistance system 101 may sent the query to the agent.

Figure 5:
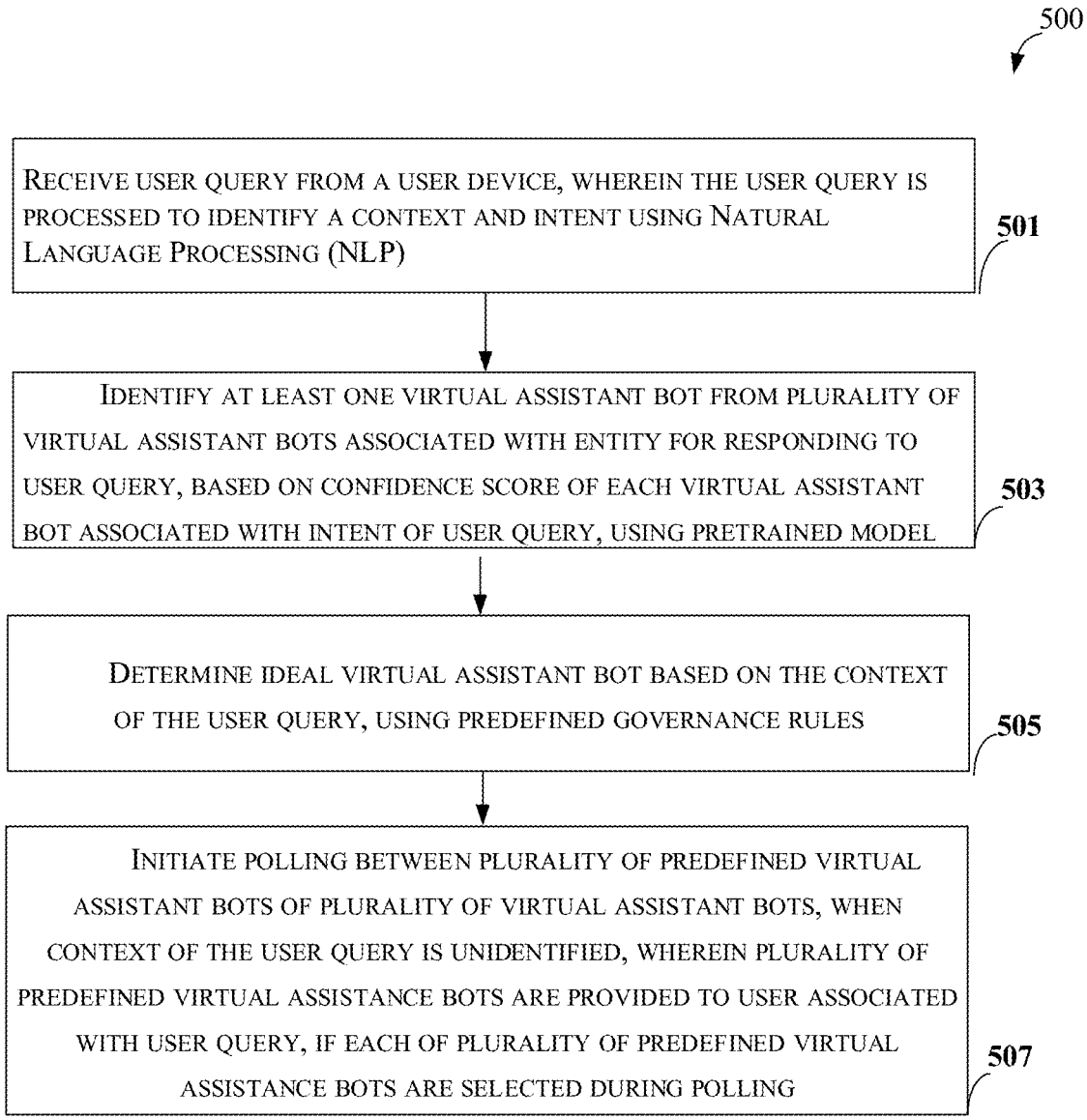
FIG. 5 illustrates a flowchart showing a method for identifying ideal virtual assistant bots for providing response to user queries in accordance with some embodiments of present disclosure.

FIG. 5 illustrates a flowchart showing a method for identifying ideal virtual assistant bots for providing response to user queries in accordance with some embodiments of present disclosure.

As illustrated in FIG. 5, the method 500 includes one or more blocks for identifying ideal virtual assistant bots for providing response to user queries. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the receiving module 213 may receive the user query from the user device 105. The user query is processed to identify the context and intent using the Natural Language Processing (NLP) technique.

At block 503, at least one virtual assistant bot from the plurality of virtual assistant bots 103 is identified by the bot identification module 217 based on the confidence score of each virtual assistant bot associated with the intent of the user query, using the pretrained model. The at least one virtual assistant bot from the plurality of virtual assistant bots 103 are identified by comparing the confidence score associated with the intent of each virtual assistant bot with the threshold confidence score.

At block 505, the ideal virtual assistant bot is identified by the bot identification module 217 based on the context of the user query using the predefined governance rules.

At block 507, the polling is initiated by the polling module 219 between the plurality of predefined virtual assistant bots of the plurality of virtual assistant bots 103, when the context of the user query is unidentified. The plurality of predefined virtual assistance bots is provided to the user associated with the user query if each of the plurality of predefined virtual assistance bots are selected during polling.

Computing System

Figure 6:
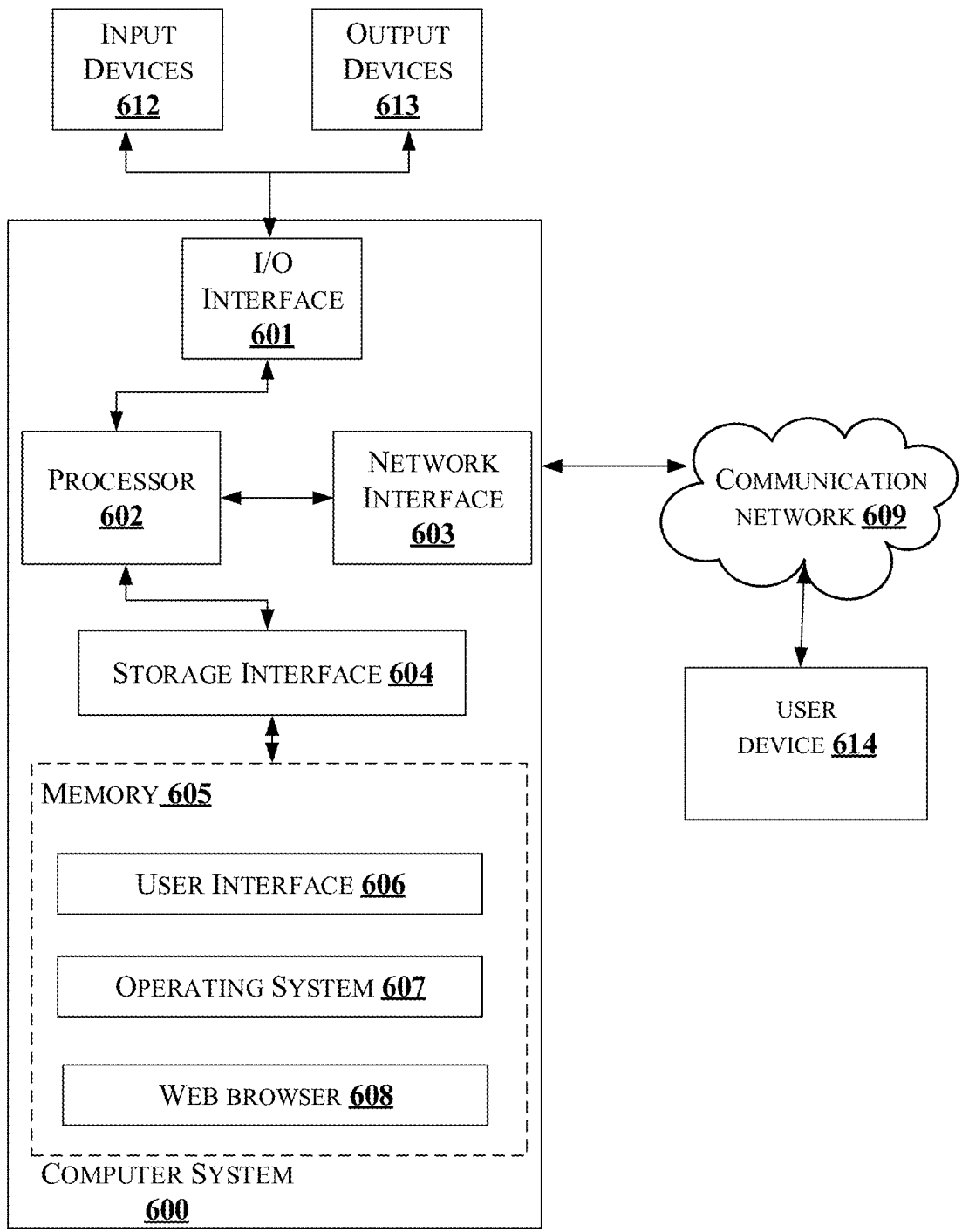
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 may be used to implement the bot assistance system 101. The computer system 600 may include a central processing unit ("CPU" or "processor") 602. The processor 602 may include at least one data processor for identifying ideal virtual assistant bots for providing response to user queries. The processor 602 may include specialized processing units such as, integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices such as input devices 612 and output devices 613. For example, the input devices 612 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 613 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 600 consists of the bot assistance system 101. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with a user device 614. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data, such as, the data, variables, records, etc., as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, NET™, CGI SCRIPTS™, JAVA™, JAVASCRIPT™, PERL™, PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages of the Present Disclosure:

In an embodiment, the method of present disclosure provides a mechanism for managing the bots during multi tasks. This helps in reducing the cognitive load on the user while using chat and voice bots and improves the manageability of bots.

An embodiment of the present disclosure provides a unified interface to interact with multiple bots for users. This improves productivity of the user and enhances user experience.

An embodiment of the present disclosure provides help to the enterprise in managing their bots for different functionalities, while at the same time without sacrificing the user experience.

Finally, the language used in the specification has been principally selected for readability and instructional purposes, and it may not have been selected to delineate or circumscribe the inventive subject matter.

The disclosed method and system overcome technical problem of providing a unified bot assistance system for providing dynamic response to user queries during multitasking and multi-contextual queries. The present disclosure resolves this problem by providing a unified bot assistance system for providing response to user queries. Particularly, the bot assistance system identifies an ideal virtual assistant bot which is capable of resolving the user queries. The bot assistance system identifies at least one virtual assistant bot from a plurality of virtual assistant bots based on a confidence score of each virtual assistant bot associated with an intent of the user query, using a pretrained model. The ideal virtual assistant bot is determined based on context of the user query. However, if the context is unidentified, a polling is initiated between a plurality of predefined virtual assistant bots of the plurality of virtual assistant bots. In case, each of the plurality of predefined virtual assistance bots are selected during polling, an option is provided to user for selecting an appropriate virtual bot among the selected predefined virtual assistant bots.

Currently, the bots deployed on various platforms are singular in nature. That is, for example, for an employee in an enterprise who wants to apply for a leave in a leave portal and also check status of a pending purchase order has to go through multiple bots. This account to accessing multiple bots for each task. This may add a cognitive load on the users to remember different hots for each tasks and hence generally leads to a poor user experience.

In light of the above-mentioned advantages and the technical advancements provided by the disclosed method and system, the claimed steps as discussed above provide response to user queries using a unified interface which orchestrates and interacts with multiple virtual assistant bots. This improves productivity of the user and enhances user experience. Thus, present disclosure provides a dynamic mechanism for managing the virtual assistant bots during multi tasks and based on dynamic multi-contextual queries. This helps in reducing the cognitive load on the user while using chat and voice bots and improves the manageability of bots. Further, the claimed steps clearly bring an improvement in the functioning of the system itself as the claimed steps provide a technical solution to a technical problem.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessors and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Reference Number | Description |
| --- | --- |
| 101 | Bot assistance system |
| 103 | Plurality of virtual assistant bots |
| 105 | User device |
| 107 | I/O interface |
| 109 | Memory |
| 111 | Processor |
| 113 | User interface |
| 200 | Data |
| 201 | Query data |
| 203 | Bot data |
| 205 | Machine learning model |
| 207 | Response data |
| 209 | Other data |
| 211 | Modules |
| 213 | Receiving module |
| 215 | Training module |
| 217 | Bot identification module |
| 219 | Polling module |
| 221 | Learning module |
| 223 | Other modules |
| 401 | User query |
| 402 | User |
| 403 | Personal loan bot |
| 405 | Customer service bot |

| Reference Number | Description |
| --- | --- |
| 407 | Credit card bot |
| 600 | Computer system |
| 601 | I/O interface |
| 602 | Processor |
| 603 | Network interface |
| 604 | Storage interface |
| 605 | Memory |
| 606 | User interface |
| 607 | Operating system |
| 608 | Web browser |
| 609 | Communication network |
| 611 | Input devices |
| 612 | Output devices |
| 614 | User device |

The invention claimed is:

1. A method of identifying ideal virtual assistant bots for providing response to user queries, the method comprising:
receiving, by a bot assistance system, a user query from a user device, wherein the user query is processed to identify a context and intent using Natural Language Processing (NLP);
identifying, by the bot assistance system, at least one virtual assistant bot from a plurality of virtual assistant bots associated with an entity for responding to the user query, based on a confidence score of each virtual assistant bot associated with the intent of the user query, using a pretrained model, wherein the identification of at least one virtual assistant bot comprises:
determining an ideal virtual assistant bot based on the context of the user query, using predefined governance rules; or
initiating a polling between a plurality of predefined virtual assistant bots of the plurality of virtual assistant bots, when the context of the user query is unidentified, wherein the plurality of predefined virtual assistance bots is provided to a user associated with the user query, if each of the plurality of predefined virtual assistance bots are selected during polling; and
wherein identifying at least one virtual assistant bot from the plurality of virtual assistant bots comprises comparing the confidence score associated with the intent of each virtual assistant bot with a threshold confidence score, and wherein when the confidence score is below the threshold confidence score, providing to a user, a list of responses closely matching to the user query using an unsupervised fallback model.

2. The method as claimed in claim 1, further comprising storing information about at least one response from the list of responses selected by the user.

3. The method as claimed in claim 1, further comprising setting the plurality of virtual assistant bots as primary bots and secondary bots, wherein the primary bots are the predefined virtual assistant bots which are authorised for participating in the polling and the secondary bots are associated with selection by the bot assistance system.

4. The method as claimed in claim 1, further comprises setting a priority for each of the predefined virtual assistant bots.

5. The method as claimed in claim 1, further comprising initiating a feedback learning for a fallback model using suggestions provided by a number of users for a similar user query.

6. A bot assistance system for identifying ideal virtual assistant bots for providing response to user queries, comprising:
a processor; and
a memory communicatively coupled to the processor, wherein the memory stores processor instructions, which, on execution, causes the processor to:
receive a user query from a user device, wherein the user query is processed to identify a context and intent using Natural Language Processing (NLP);
identify at least one virtual assistant bot from a plurality of virtual assistant bots associated with an entity for responding to the user query, based on a confidence score of each virtual assistant bot associated with the intent of the user query, using a pretrained model, wherein the identification of at least one virtual assistant bot comprises:
determining an ideal virtual assistant bot based on the context of the user query, using predefined governance rules; or
initiating a polling between a plurality of predefined virtual assistant bots of the plurality of virtual assistant bots, when the context of the user query is unidentified, wherein the plurality of predefined virtual assistance bots is provided to a user associated with the user query, if each of the plurality of predefined virtual assistance bots are selected during polling; and
wherein the processor identifies the at least one virtual assistant bot by comparing the confidence score associated with the intent of each virtual assistant bot with a threshold confidence score, and wherein when the confidence score is below the threshold confidence score, the processor provides a list of responses closely matching to the user query using an unsupervised fallback model.

7. The bot assistance system as claimed in claim 6, wherein the processor initiates storing information about at least one response from the list of responses selected by the user.

8. The bot assistance system as claimed in claim 6, wherein the processor sets the plurality of virtual assistant bots as primary bots and secondary bots, wherein the primary bots are the predefined virtual assistant bots which are authorised for participating in the polling and the secondary bots are associated with selection by the bot assistance system.

9. The bot assistance system as claimed in claim 6, wherein the processor sets a priority for each of the predefined virtual assistant bots.

10. The bot assistance system as claimed in claim 6, wherein the processor initiates a feedback learning for a fallback model using suggestions provided by a number of users for a similar user query.

* * * * *